Inventor
Frederick A. Hart
by Robert H Strother
Attorney

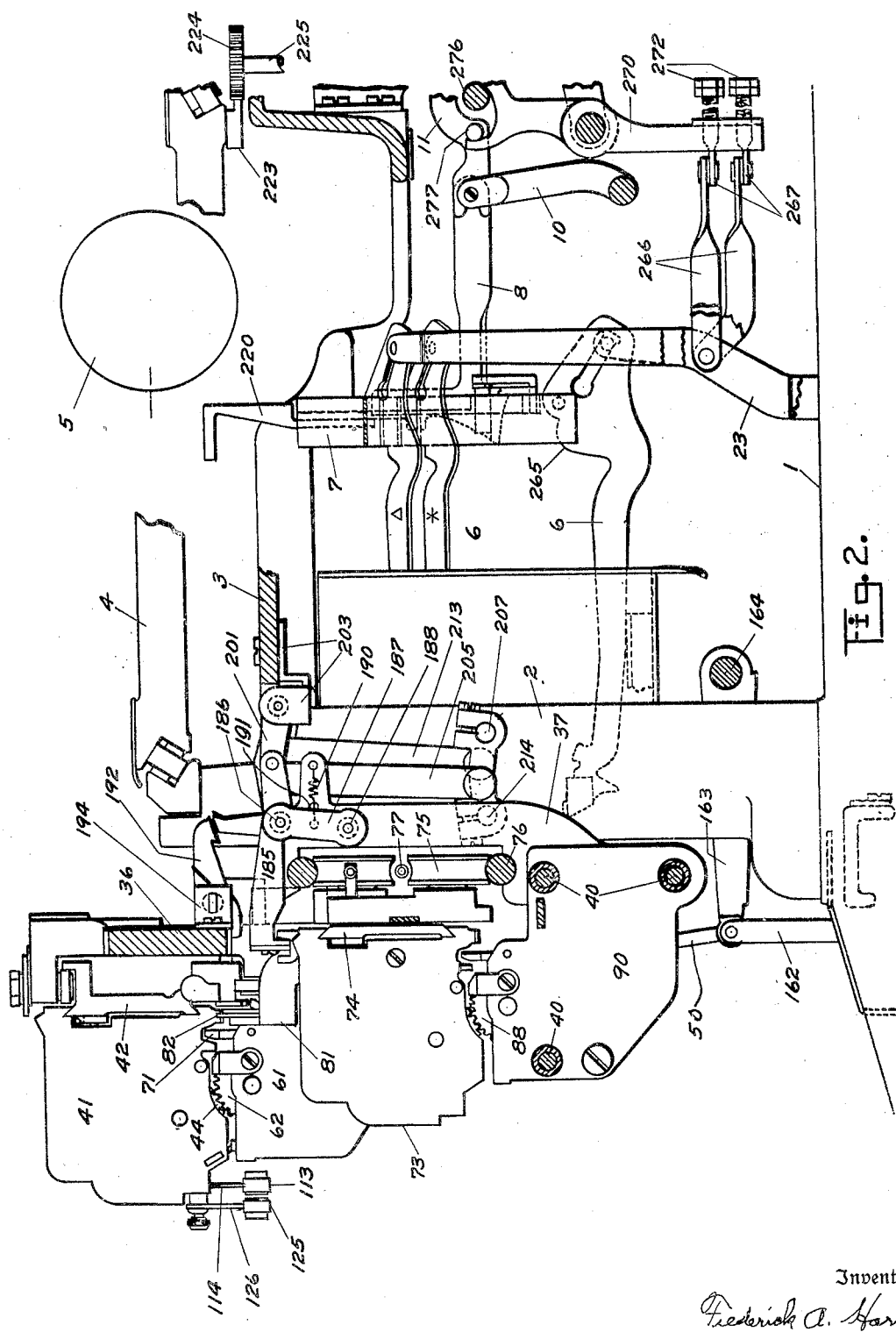

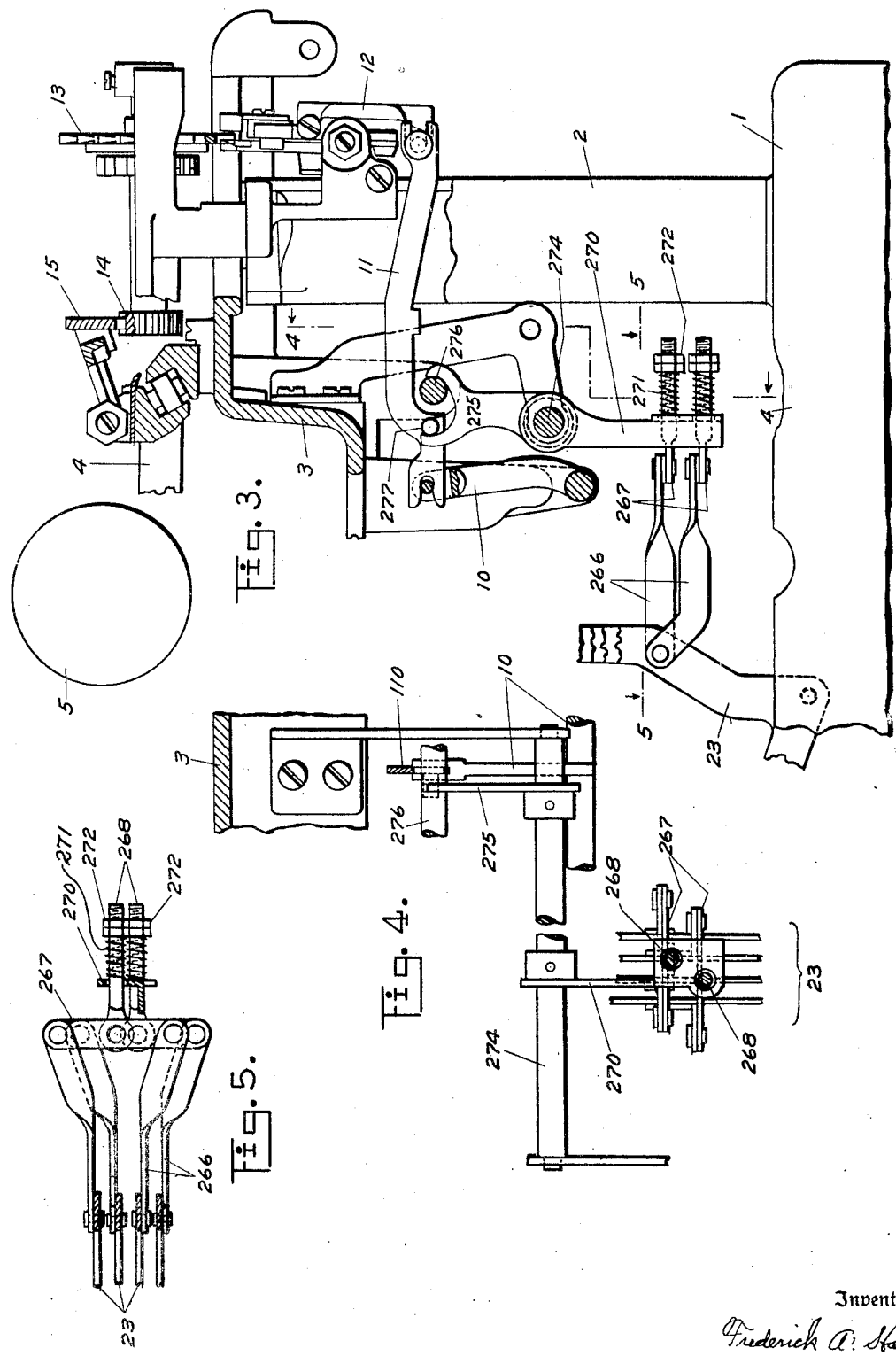

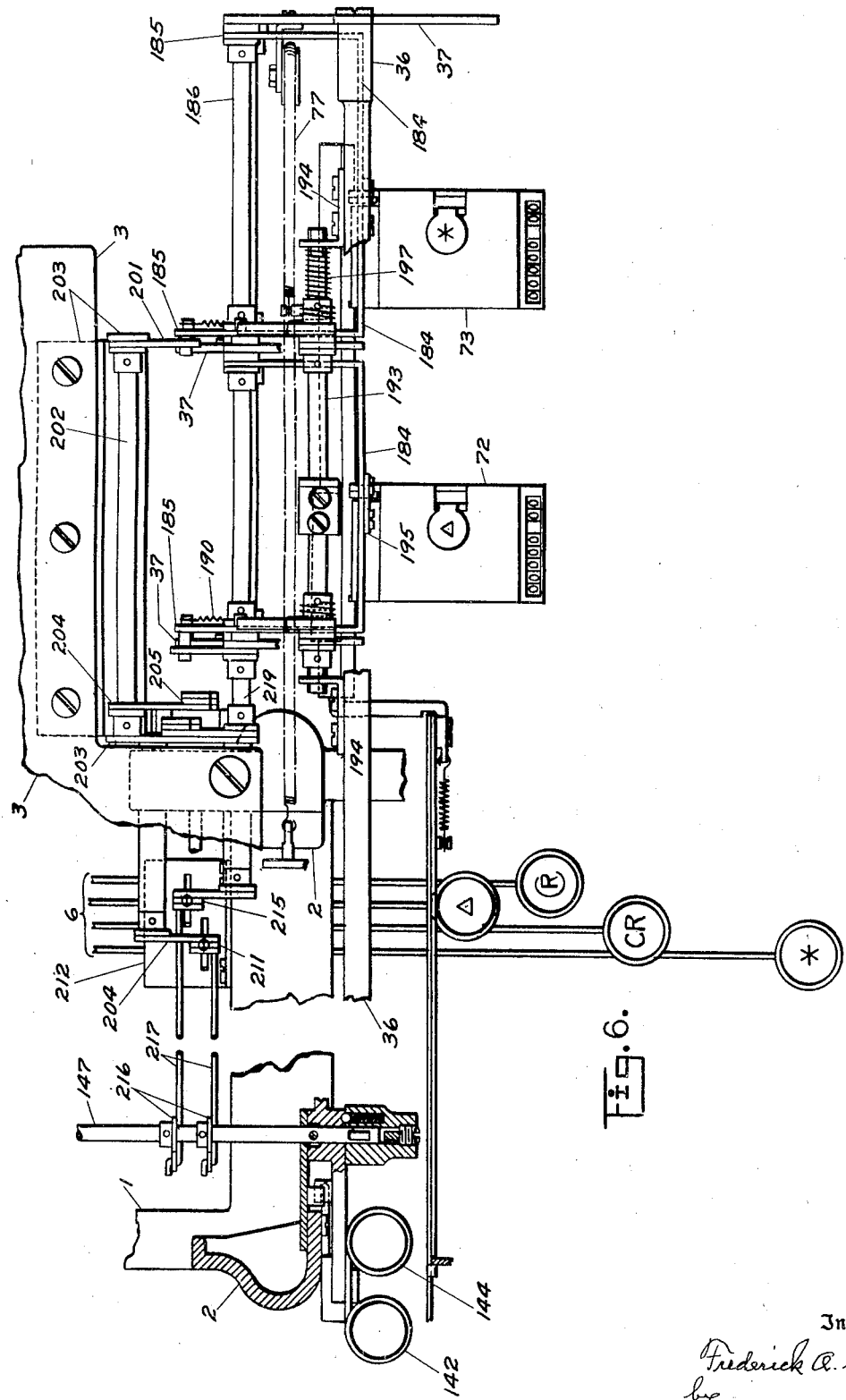

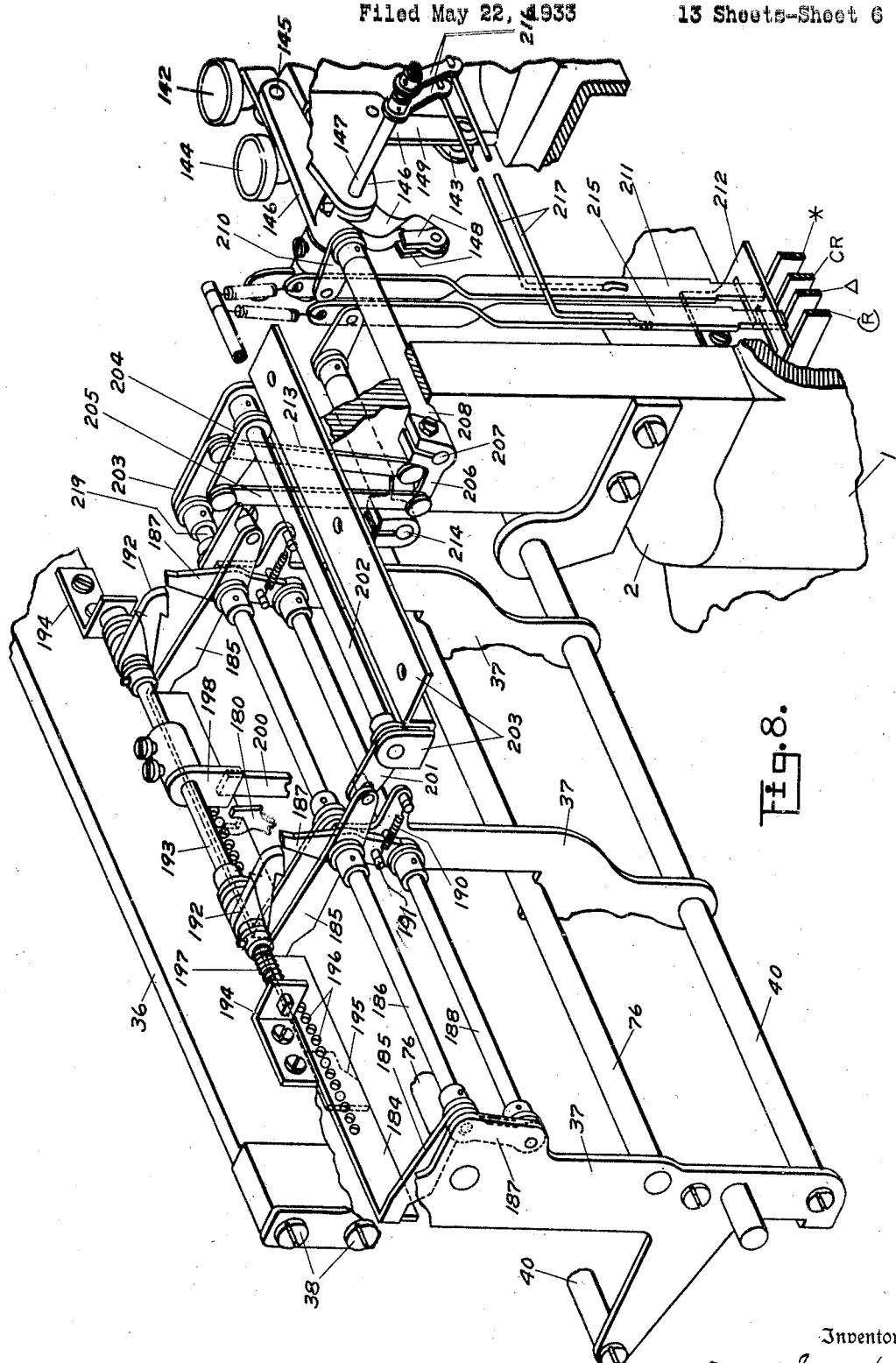

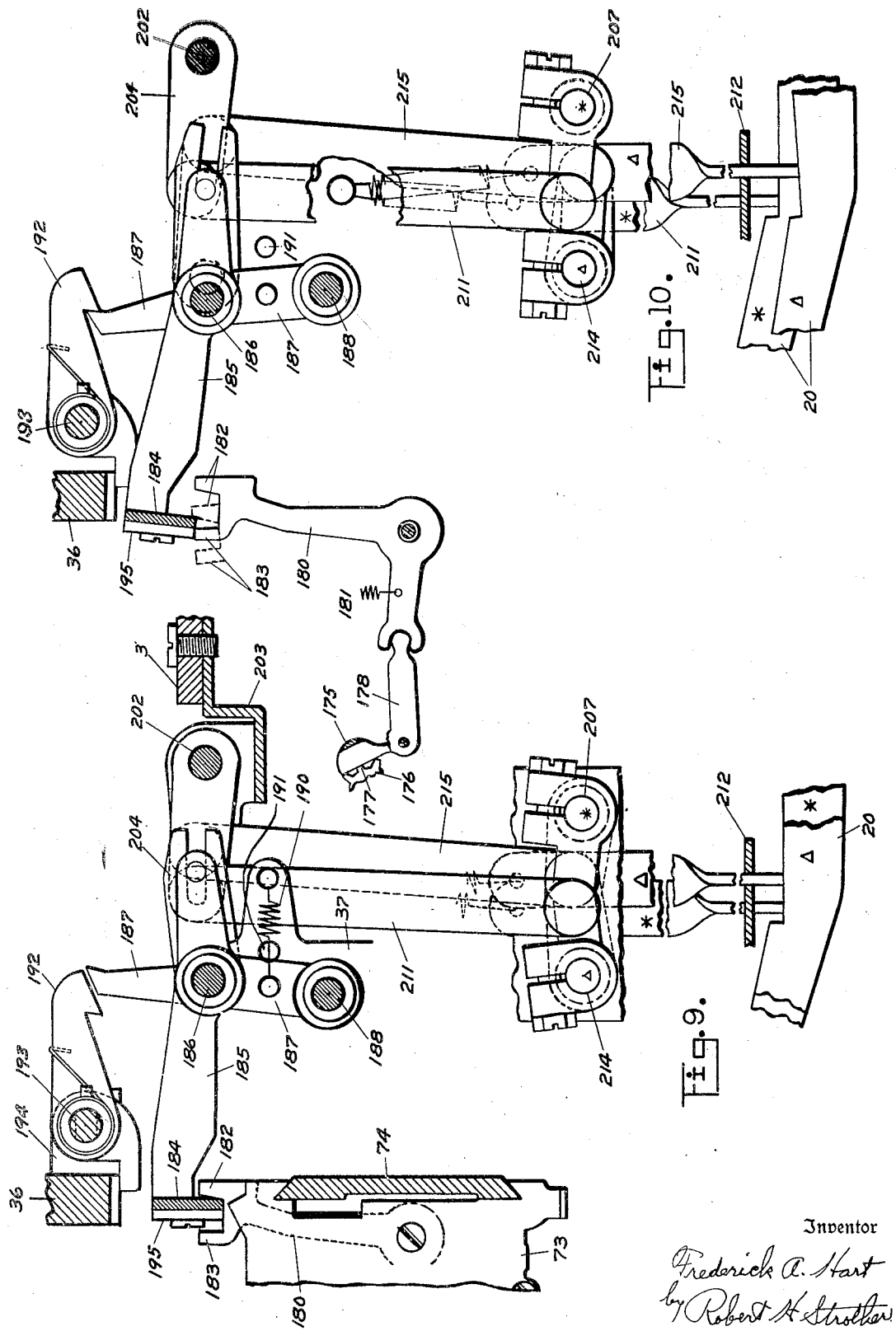

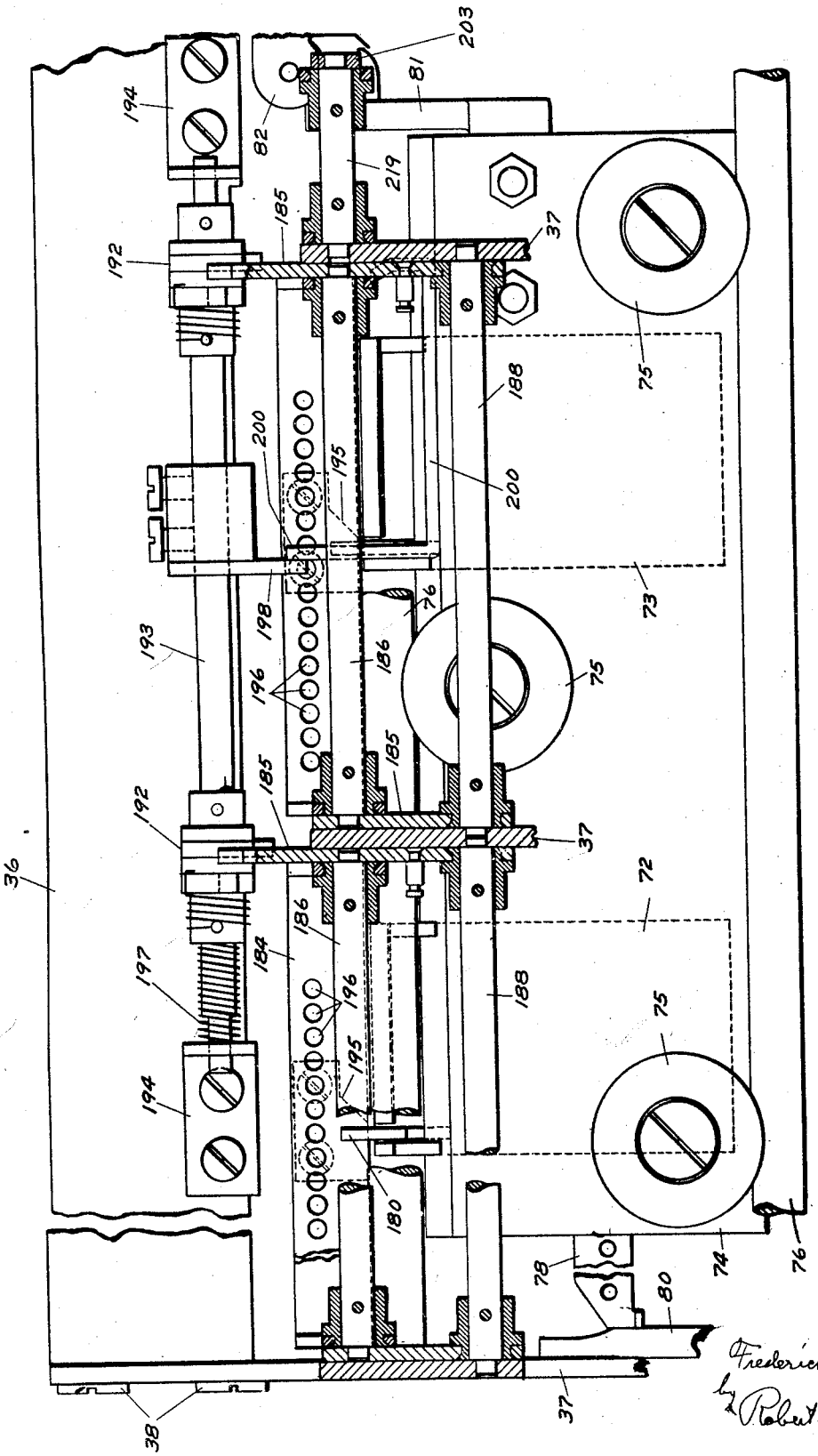

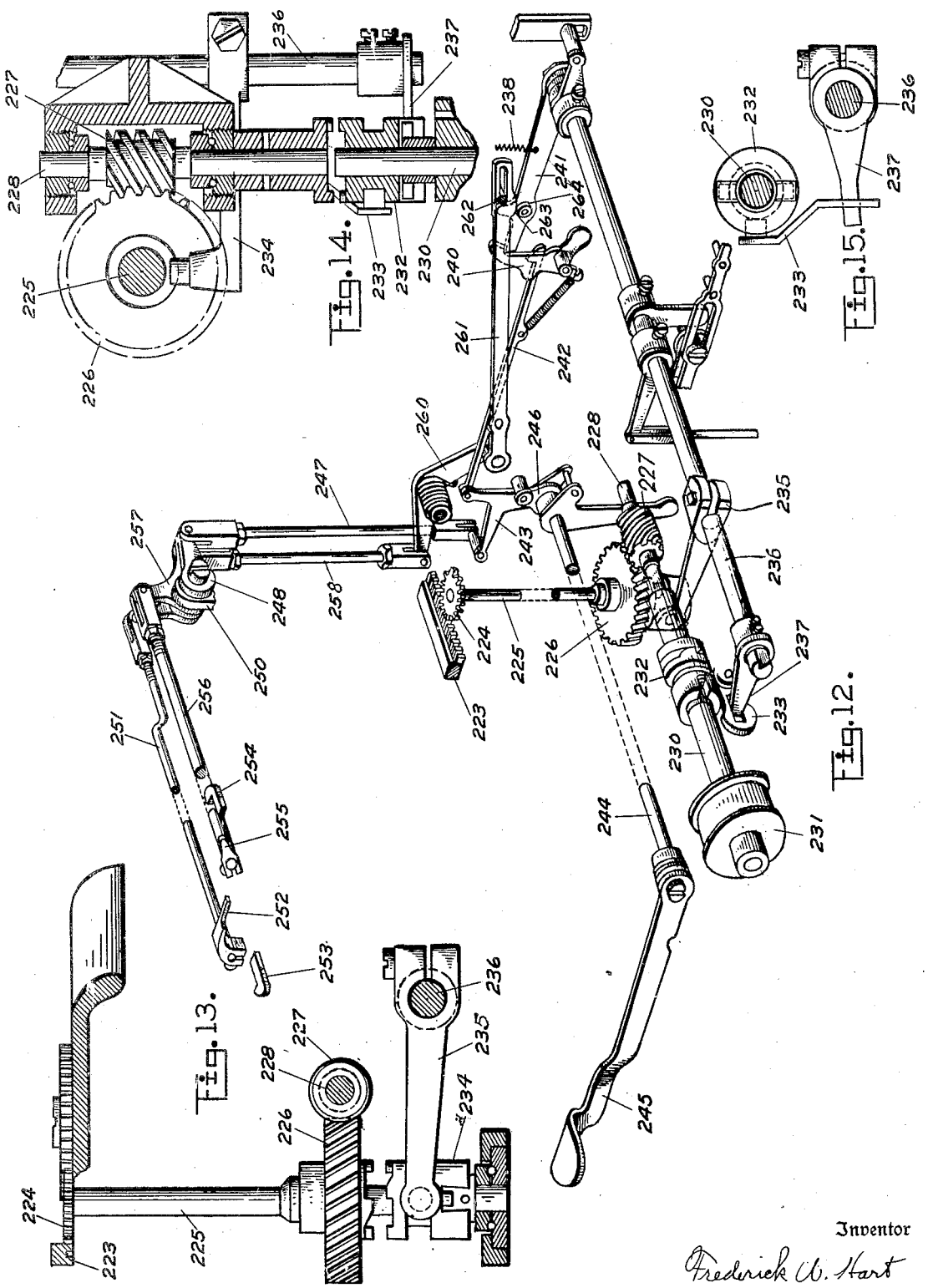

June 15, 1937.  F. A. HART  2,083,994
ACCOUNTING MACHINE
Filed May 22, 1933    13 Sheets-Sheet 10
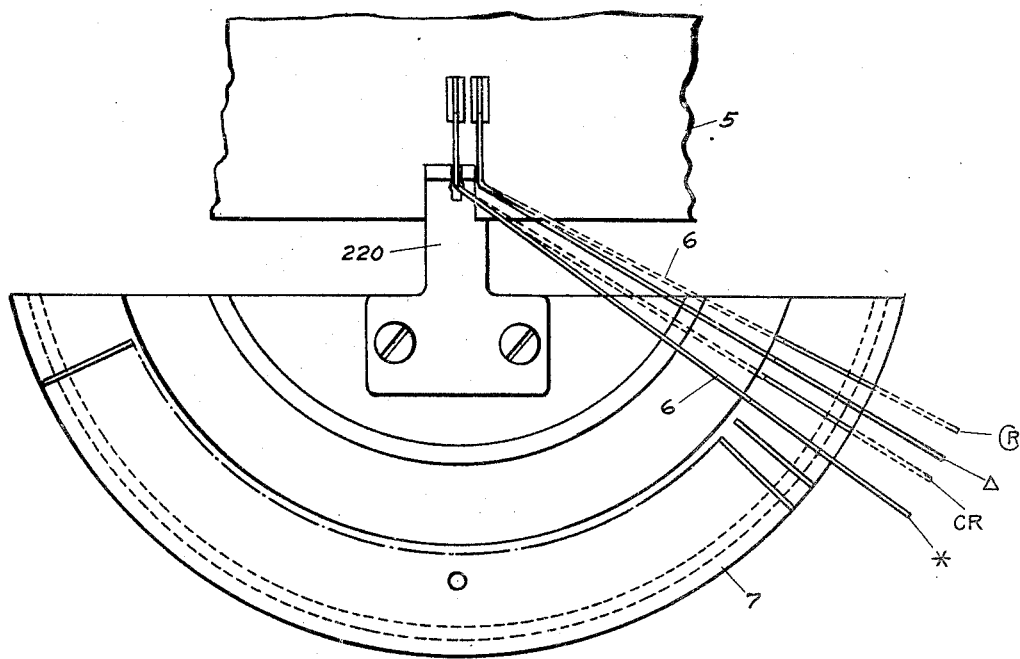
Fig. 19.
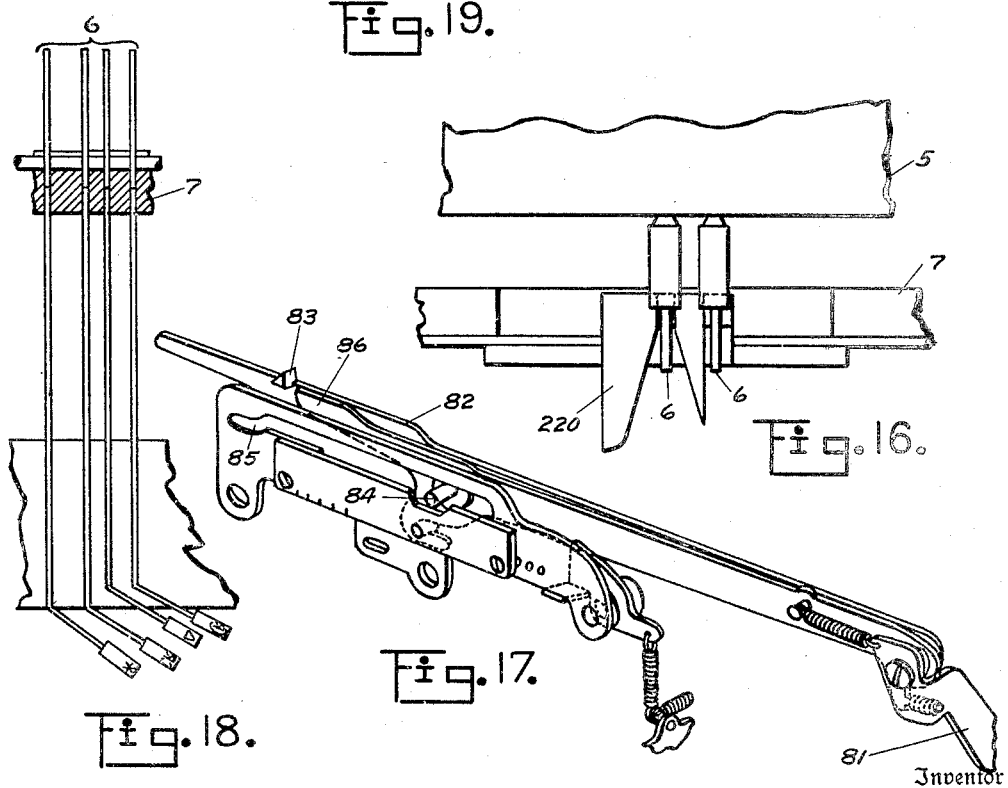
Fig. 16.
Fig. 17.
Fig. 18.
Inventor
Frederick A. Hart
by Robert H. Strother
Attorney

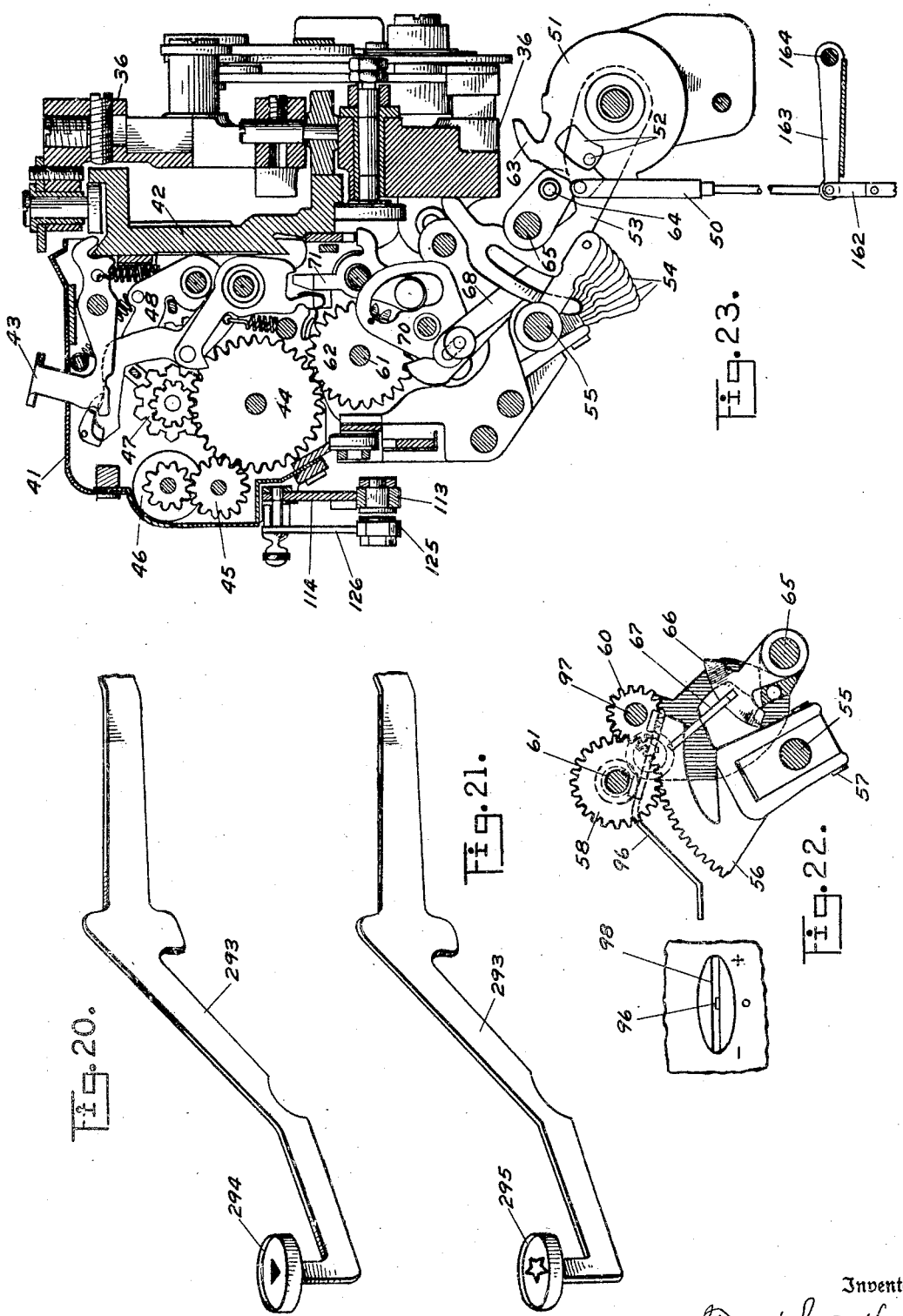

June 15, 1937.    F. A. HART    2,083,994
ACCOUNTING MACHINE
Filed May 22, 1933    13 Sheets-Sheet 12
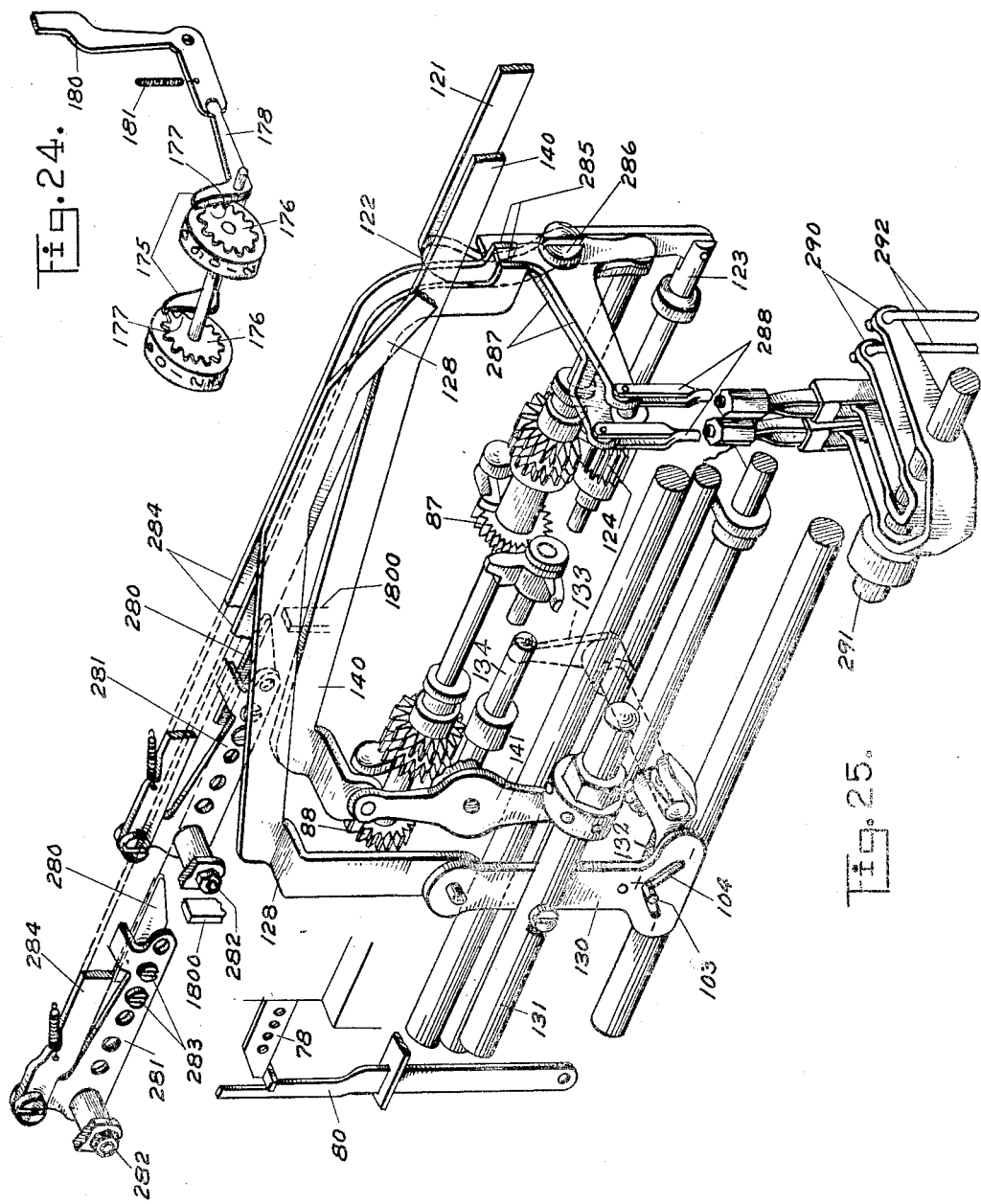
Inventor
Frederick A. Hart
by Robert H. Strother
Attorney June 15, 1937.                F. A. HART                2,083,994
                          ACCOUNTING MACHINE
              Filed May 22, 1933        13 Sheets-Sheet 13
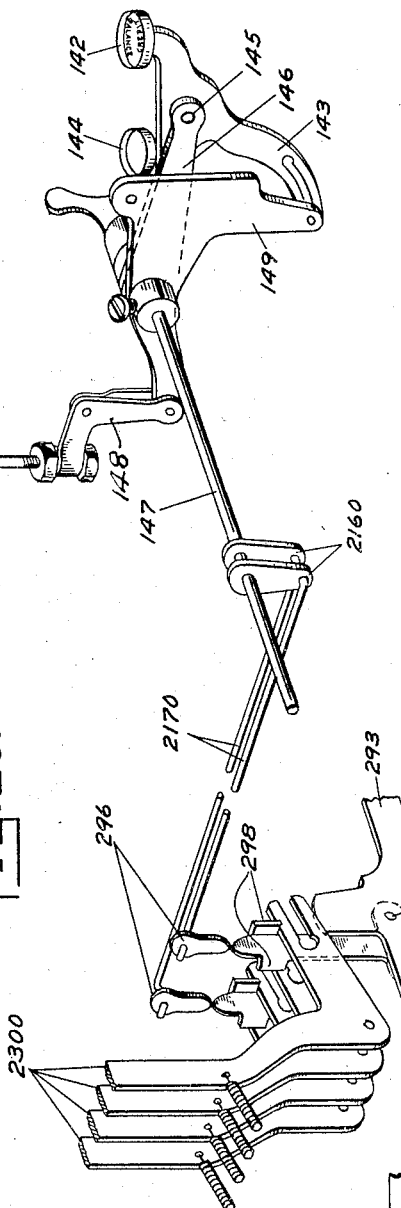
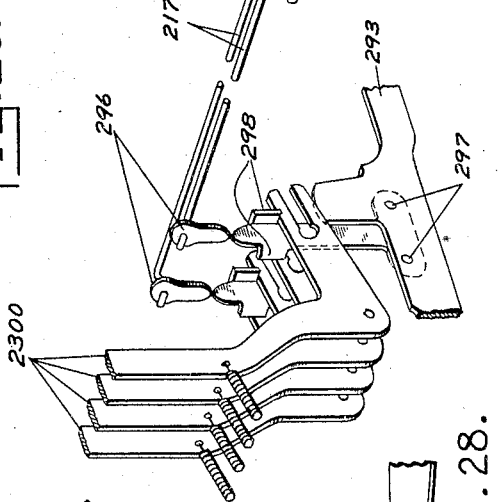
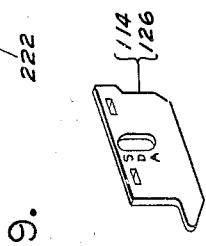
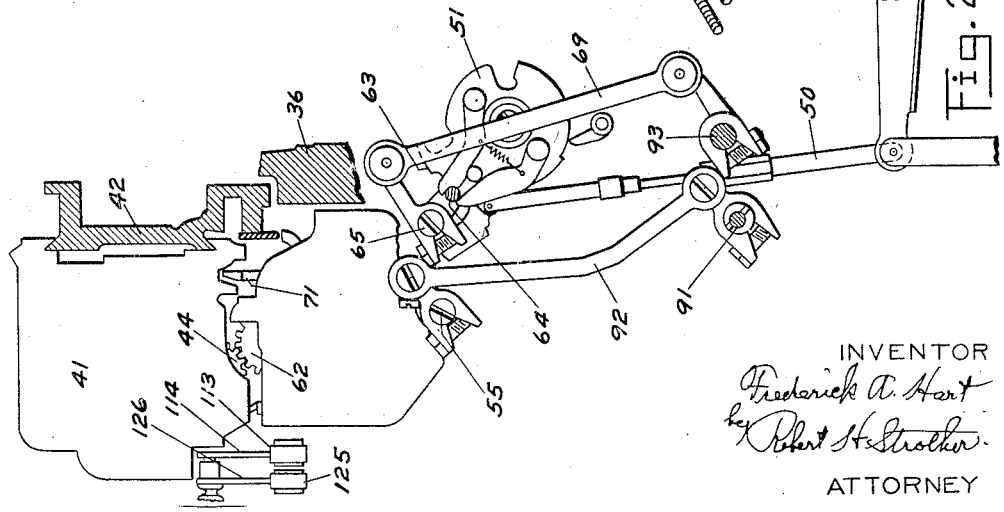
INVENTOR
Frederick A. Hart
by Robert H. Strother
ATTORNEY Patented June 15, 1937

2,083,994

UNITED STATES PATENT OFFICE 2,083,994

ACCOUNTING MACHINE

Frederick A. Hart, Stamford, Conn., assignor to Remington Rand, Inc., Buffalo, N. Y., a corporation of Delaware Application May 22, 1933, Serial No. 672,179

6 Claims. (Cl. 235—59)

The present invention relates to computing and recording machines, and is especially adapted to combined typewriting and computing machines.

The invention has for its principal object to safeguard the correctness with which these machines are operated.

Another object of the invention is to provide improved clear signal mechanism, and especially for a machine having a plurality of cross-footing totalizers.

Still another object of the invention is to provide an improved clear signal mechanism automatically operated from a source of power.

A further object of the invention is to provide improved means for so checking the work not only of the operator but also of preceding accounting operations that the machine will show mechanically that the work has been done correctly, certain errors in the work so modifying the operation of the machine that the operator will be apprised of the fact in case a mistake has been made.

To the above and other ends which will hereinafter appear, my invention consists in the features of construction, arrangements of parts and combinations of devices set forth in the following description and particularly pointed out in the appended claims.

I have shown the invention in the present instance embodied in a No. 85 Remington electrified bookkeeping machine, in which the invention may be readily included without modifying or materially modifying the existing structural features of such machine, it being one of the objects of my invention to attain this end. This machine is disclosed in part in my Patent No. 2,063,737, issued December 8, 1936, and includes the well known Wahl computing mechanism shown in Patent No. 1,270,471 to J. C. Wahl. It should be understood, however, that the invention is not restricted in its use in said machine but may be included in machines of this same general type, wherever found available.

In the regular No. 85 Remington electrified bookkeeping machine, most of the operations are performed by a continuously rotating electric motor under the control of keys, and the machine has in addition to the vertical totalizers two cross-footing totalizers, each independently capable of addition and subtraction. According to one form of the invention each of these cross-footing totalizers is provided with an automatic clear signal so constructed that immediately following the writing of the last digit of a total the power mechanism will, in case the total has been copied correctly, cause the typewriting mechanism to print a clear sign following the number. This sign is different for the two totalizers. Each totalizer also prints a separate distinctive sign in case the total contained therein was negative.

In case both cross-footers are cleared by the same operation of the machine, both clear signals will be printed simultaneously one by the side of the other. This form of the invention can be used in that class of work where different amounts are entered in different columns, some of them being added into one cross-footer and some into the other, but these amounts being of such relation to one another that both cross-footers will indicate the same total provided the entries have been correctly made. This form of the invention can also be used where the two cross-footers are used for the purpose of giving a single algebraic total, the correct total appearing in one totalizer in case it is positive, and the other totalizer in case it is negative. Means may be provided whereby both totalizers will be cleared by the same total-printing operation, and also means whereby both clear signals are simultaneously operated, thus indicating at once that both totalizers showed the same amount and that that amount was correctly copied and both totalizers cleared; the failure of either clear signal to operate will serve as a warning to the operator.

A simpler form of the invention is also shown in which the clear signals are printed by hand instead of by power, the clearance being indicated by locks which prevent the depression of the necessary keys unless the totalizers are clear.

In the accompanying drawings wherein like reference characters designate corresponding parts in the different views:

Fig. 2 is a right-hand side view of a portion of the machine, parts being shown in section.

Fig. 3 is a fragmentary front to rear vertical section of the upper rear portion of the machine.

Fig. 4 is a rear view, partly in section on the line 4—4 of Fig. 3.

Fig. 5 is a top view in horizontal section on the line 5—5 of Fig. 3.

Fig. 6 is a fragmentary plan view with parts in section and parts broken away, showing the forward portion of the machine.

Fig. 8 is an isometric view of a portion of the mechanism, as viewed from behind and at the right of the machine.

Figs. 9 and 10 are detail views, partly in front to rear vertical section, of some of the clearance-proof mechanism, as viewed from the right, the mechanism being in different positions in the two views.

Fig. 11 is a rear elevation, partly in vertical section, showing some of the clear signal mechanism.

Figure 1:
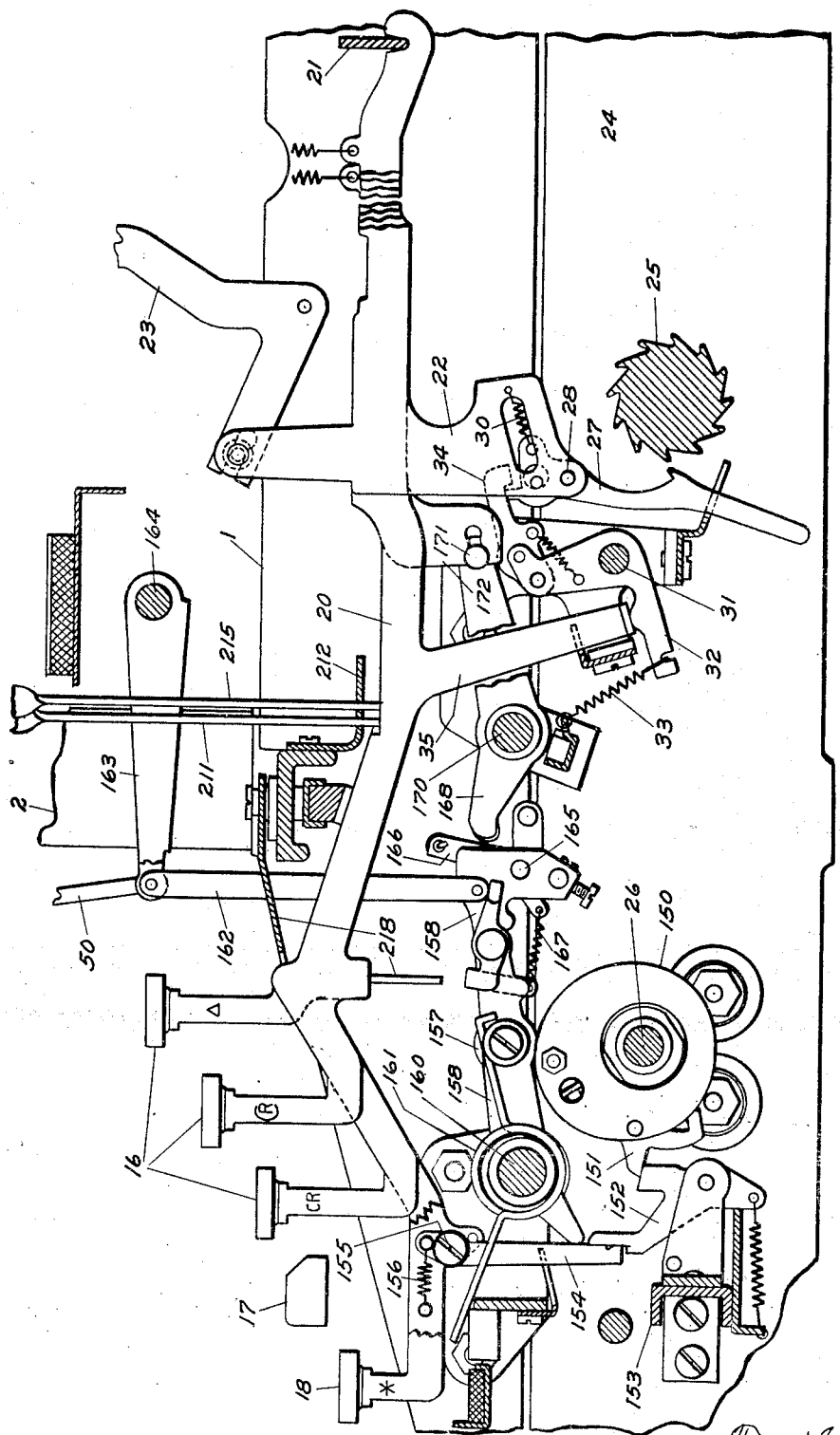
Fig. 1 is a partial front to rear vertical section of an electrified Remington accounting machine, containing the present invention.

Figs. 12, 13, 14, and 15 are fragmentary views of the carriage return mechanism of the machine. Fig. 12 is an isometric view as seen from the rear and to the right. Fig. 13 is a right-hand side elevation, partly in section. Fig. 14 is a plan view, partly in section in the plane of the axis of the horizontal drive shaft. Fig. 15 is a view in right-hand side elevation showing the means for operating one of the clutches.

Fig. 16 is a fragmentary top elevation showing two type bars at the printing point.

Fig. 17 is an isometric view of the pick-up beam and associated parts.

Fig. 18 is an edge view of the four type bars which print the clear signs.

Fig. 19 is a fragmentary front view of the type bar segment, and showing two of the clearance types in printing positions.

Figs. 20 and 21 are fragmentary isometric views of the two key levers for the key operated form of the invention.

Fig. 22 is a view of the gearing which drives the master wheel and its associated parts.

Fig. 23 is a view in vertical section through one of the vertical totalizers, the actuating mechanism and associated parts.

Fig. 24 is a fragmentary isometric view of the clearance testing device.

Fig. 25 is an isometric view taken from the rear and showing the change gear mechanism of the cross totalizers and also a portion of the hand-operated clearance proof mechanism.

Fig. 26 is an isometric view of one of the control cams.

Fig. 27 is a fragmentary isometric view of a portion of the credit balance mechanism and a portion of the hand-operated clearance proof mechanism.

Fig. 28 is a partial view in front to rear section and showing some of the mechanism of the computing machine.

Fig. 29 is a view of an audit sheet and ledger sheet, which may be written on the machine.

In all of the views parts have been omitted, or broken away, or shown in section, as has been found convenient.

The Remington electrified bookkeeping machine consists essentially of a Remington bookkeeping machine mounted on a power base. The frame of the Remington accounting machine comprises the usual base 1 (Figs. 2 and 3), corner posts 2 and top plate 3, on which last travels the paper carriage 4 supporting the platen 5 against which strike the types on the type bars 6, pivoted in a segment 7. The heels of the type bars operate a universal bar 8, which operates a rocking frame 10, which, by a link 11, operates the dog rocker 12 of the carriage escapement mechanism. The escapement wheel 13 is connected with a feed pinion 14, meshing with the carriage rack 15 to feed the carriage under the control of a driving spring (not shown).

The keys are arranged, as shown in Fig. 1, with three banks of character keys 16, having in front of them the space bar 17, and in front of that a row of keys 18 which includes the ten numeral keys. The numeral keys not only control corresponding type bars, but also control the computing mechanism. All of the keys 16 and 18 are mounted on key levers 20 extending to the back of the machine where they are pivoted at 21. The character key levers are interspersed with operating levers 22 which are connected to the usual bell cranks 23, which operate the type bars. The depression of any character key lever 20 couples the associated lever 22 to the power drive to operate said lever and the appropriate type bar.

The power base comprises a frame 24 on which the base 1 of the typewriter rests. This base carries an electric motor connected by belts to certain shafts, the principal ones of which are the usual snatch roll 25 for operating the character type bars, and the usual power shaft 26 for operating the computing mechanism and the numeral type bars.

In order to operate the character type bars each of the operating levers 22 (Fig. 1) has a depending portion to which a hook 27 is pivoted at 28, and adapted to be engaged by the snatch roll 25. These hooks are normally held away from the snatch roll by springs 30. Pivoted on a cross-shaft 31 is a series of levers 32 controlled by springs 33, and each having pivoted thereto a hook 34 engaging a finger of the appropriate hook 27. Each of the character key-levers 20 has an arm or projection 35 which, when depressed, rocks the lever 32, and by the hook 34 draws the hook 27 into engagement with the snatch roll, which thereupon operates the type bar after the usual fashion of these machines. The ten digit type bars are operated by different means to be described hereinafter.

The computing mechanism is of the usual Remington type. It has its own frame work attached to the typewriter frame work, the principal member thereof being a long casting 36, Figs. 2, 8, and 23. To this casting are secured various frame plates 37, of which the righthand end one is shown in Fig. 8 attached to the end of the casting 36 by screws 38. These frame plates support various transverse frame bars and rods, such as those marked 40 in Fig. 8. The vertical totalizers 41 are mounted on the usual truck 42 supported by the various rollers shown in Fig. 23, and each totalizer adjustably secured in place by the usual latch 43. The totalizers comprise the usual carrying wheels 44, idlers 45 and dials 46, and also the usual Geneva transfer wheels 47 mounted on the levers 48.

The computing mechanism is operated by the usual links 50, (Fig. 23) which rock so-called fans 51, which by pin and slot connection 52 operate the goose neck cams 53, which in turn operate the arms 54 spirally arranged on the differential rock shaft 55 which (Fig. 22) carries the gear segment 56 which operates the master wheel. This segment is pivoted at 57 so as to allow values to be entered in only one direction of movement. Thus the segment 56 may swing laterally into and out of engagement with the pinion 58, in case the machine is set for addition, or with the pinion 60 in case the machine is set for subtraction, said gears being shiftable into and out of the plane of movement of the sector in a well known manner. Pinion 60 meshes with pinion 58, which latter is splined on the shaft 61 to which is rigidly secured the master wheel 62, (Fig. 23) which is adapted to mesh one after another with the carrying wheels 44 of the several totalizers.

Each fan 51 has a cam projection 63 adapted to operate the universal bar 64, which is in the nature of a bail secured to the universal rock shaft 65. This rock shaft performs its usual functions in the machine. For example, it carries the spiral cam 66 (Fig. 22), which controls the slide 67, which swings the sector 56 into and out of mesh. The universal rock shaft also has an arm which operates a link 68, which rocks a cam 70, which operates the master dog 71, whose rearwardly extending arm locks the truck 42 in position during an adding operation, and whose upstanding arm rotates the appropriate lever 48, which carries a transfer pinion 47. This universal bar mechanism also controls various locks, aligning devices, etc., all as well known in this machine.

The two cross-foot totalizers 72 and 73, Figs. 2, 6 and 11, are mounted on the usual cross truck 74, having grooved rollers 75, running on rails 76. This truck is drawn by the usual spring 77 to its normal right-hand position where it is arrested by an adjustable stop bar 78, Fig. 11, striking an upright lever 80 and deflecting it until it is arrested by the right-hand frame plate 37.

In order to move the truck 74 step-by-step leftward in unison with the main truck 42 when one of the vertical totalizers 41 is over the master wheel, a bracket 81 secured to the cross truck has pivoted thereto the usual pick-up beam 82 (Fig. 17) whose triangular tooth 83 is caught by a suitable projection from the frame plate of the totalizer in use at the time. When the vertical totalizer steps out of the adding column a pin 84 on the beam 82 is moved downward by a cam slot 85, and disconnects the tooth 83 so that the cross-truck jumps back to its initial position ready to be picked up by the next vertical totalizer that comes into use. The pick-up beam 82 is associated with the usual overthrow preventing latch 86.

The master wheels for the cross-totalizers are best shown in Fig. 25, which is a rear view. They comprise a master wheel 87 for the left-hand totalizer 72, and a master wheel 88 for the right-hand totalizer 73. Motion is communicated to these master wheels by the means indicated in Fig. 28. In the casing 90, Fig. 2, of the operating mechanism for the cross-totalizers, there is a differential shaft 91 corresponding in all respects with the shaft 55, except for the absence of the arms 54, and this shaft 91 is operated from the shaft 55 by the link 92 pivoted to parallel arms projecting respectively from the shafts 55 and 91. This frame also contains a universal rock-shaft 93 operated from the universal rock-shaft 65 by a link 69 pivoted to parallel arms on the two shafts. The shaft 91 carries two gear sectors, one for each of the master wheels 87 and 88 (Fig. 25), and each controlled from the rock shaft 93 in the same manner as the upper sector is controlled from the rock shaft 65.

Subtraction

Figure 7:
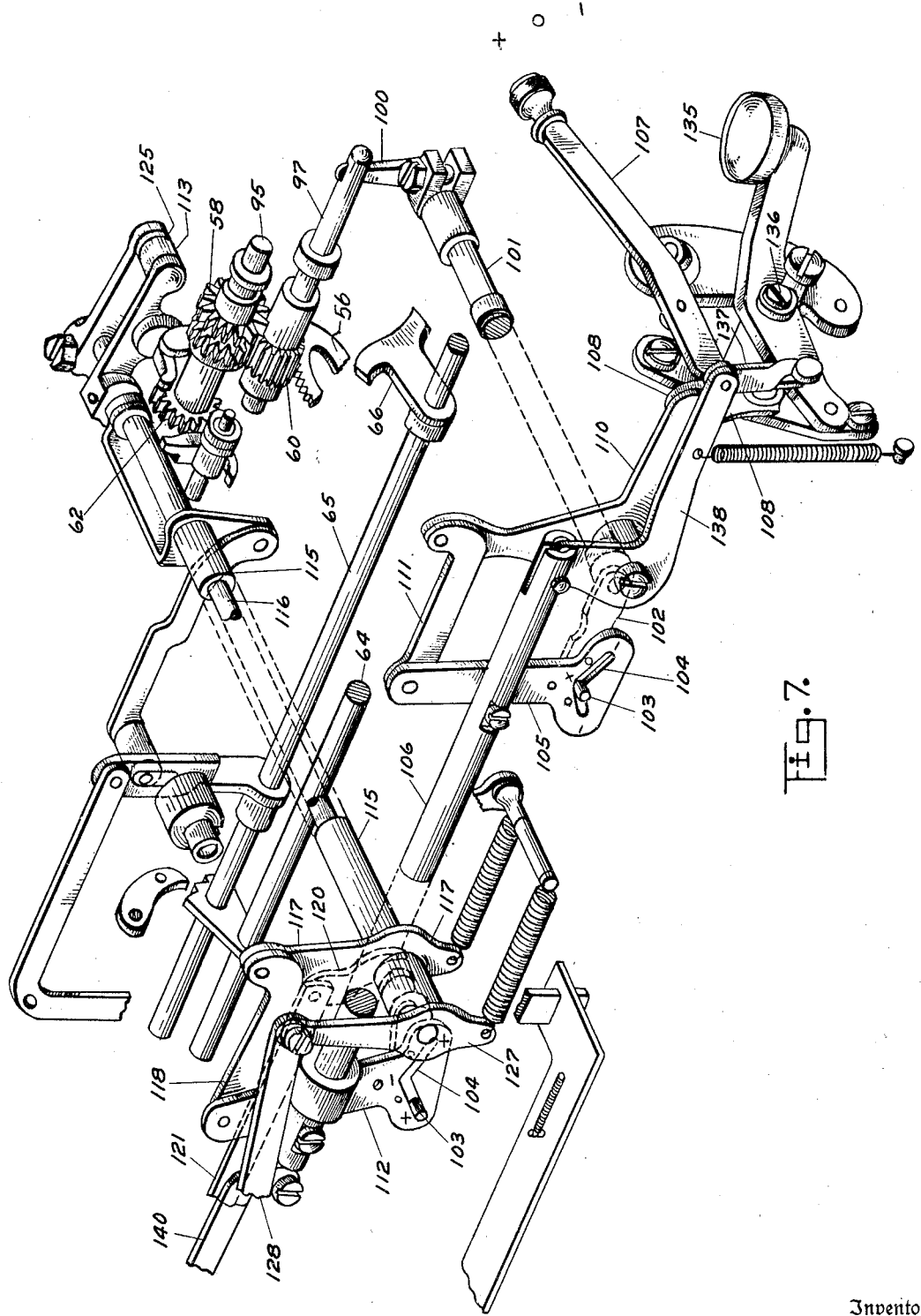
Fig. 7 is an isometric skeletonized view of a portion of the change gear mechanism etc., the observer being at the left and back of the machine.

The mechanism whereby the vertical master wheel 62 is set for subtraction, is indicated in Fig. 7. The pinion 58 is slidably mounted on the shaft 95 of the master wheel 62, and the pinion 60 slides right and left with the shaft 97 on which it is rotatably mounted. A lever 96 (Fig. 22) of the first order, causes the two pinions to shift in opposite directions, said lever being prolonged to project through a slot 98 in the casing to give a visible indication of the setting. When the shaft 97 is slid to its left-hand position (to the right in Fig. 7) the pinion 60 is out of the path of segment 56 and the pinion 58 in its path, and the master wheel will add. When said shaft is shifted to its opposite position segment 56 will engage pinion 60 and the machine will subtract. In a middle position the segment will engage neither pinion and the master wheel will not be rotated.

In order to shift the shaft 97, an arm 100 engages a notch in said shaft, said arm being mounted on the forward end of a rock shaft 101, which at its rear end has an arm 102 having a stud 103 projecting into a cam slot 104 in a floating lever 105, which lever is pivoted at its middle on a rod 106. The lever 105 can be rocked by a key or hand lever 107 through a link 108, bell crank 110, and link 111. When this lever 107 is in its uppermost position, shown in Fig. 7, the pin 103 is in the middle high part of the cam slot 104, and the machine is set for addition in the vertical totalizers. When the handle 107 is pushed down to its lowermost position it will rock lever 105 counterclockwise in Fig. 7, and move the pin into the left-hand lower end of the slot, thus rocking the shaft 101 counterclockwise and setting the mechanism for subtraction. At the intermediate position pin 103 is half-way down the slot 104 and the mechanism is set for non-add or "disconnect".

The cross master wheel 87, Fig. 25, is controlled by a second floating lever 112, Fig. 7, pivoted on the rod 106 and controlled by a cam follower 113 at the front of the machine where it is acted on by the rear one 114 of two add and subtract cams mounted on the front of each vertical totalizer, Fig. 23. The follower 113 is on the front end of a sleeve 115, Fig. 7, surrounding a shaft 116. At its rear end the sleeve 115 carries a spring returned lever 117 which is connected by a link 118 with the floating lever 112. The floating lever 112 is similar in all respects to the lever 105. The pin 103, which is controlled by its cam slot 104, is mounted on a bell crank 120 which is connected by a link 121, Figs. 7 and 25, with a lever 122 of the first order which is pivoted to a shaft 123 of a subtract pinion 124 which is connected with the master wheel 87. This pin 103, however, normally stands in the extreme left-hand end of the slot 104, as viewed in Fig. 7, so that when the follower 113 is depressed the pin moves upward. In the case of this floating lever, therefore, the depressed position of the pin 103 is the add position, and its elevated position in the middle of the slot is its subtract position. The construction is such that when the follower 113 is in its normal upper position the master wheel 87 is set for addition, and when said follower is depressed by its cam 114 it sets the master wheel for non-add if depressed half way, and for subtraction if fully depressed.

The reversing mechanism for the master wheel 88 is controlled by a second follower 125, Figs. 7 and 23, which is controlled by the forward one 126 of the two subtract cams on each vertical totalizer. The lever arm on which this follower is mounted is rigid on the shaft 116, which at its rear end carries a spring controlled lever 127, which is connected by a link 128, Figs. 7 and 25, with a third floating lever 130, which is pivoted on a second rod 131 similar to but shorter than the rod 106. This floating lever 130 has its cam slot 104 controlling a pin 103 mounted on an arm 132 on the rear end of a rock shaft which, at its forward end, carries an arm 133 connected with a shaft 134 of the subtract pinion for the master wheel 88. This pin 103 normally occupies its upper position in the slot 104.

A correction key 135 (Figs. 7 and 27) is provided which, when depressed, reverses the action of all three master wheels whether set for addition or for subtraction. In case any master wheel is set for non-add that setting will be retained if the correction key is depressed. This key is in the nature of a lever of the first order pivoted at 136 and connected by a link 137 with a bell crank 138, the upstanding arm of which is pivoted to the rod 106, the construction being such that a depression of the key 135 slides said rod towards the right (towards the left in Fig. 7) a sufficient distance so that the lower end of each of the floating levers 105 and 112 is moved half the length of the cam slot 104. In case the floating lever 105 stands in its normal add position, shown in Fig. 7, the cam slot 104 will move leftward, as viewed in Fig. 7, until the pin 103 is in the right-hand end of it, and is set for subtraction. If this lever 105 had been set for subtraction by the lever 107 the pin 103 would have occupied the left-hand end of the slot 104, as viewed in Fig. 7, and a depression of the correction key would have caused it to engage the middle of the slot, and to set the master wheel for addition. If the lever 107 was in its middle or disconnect position the pin 103 would have been half down the left-hand incline of the slot 104. The movement of the floating lever by the correction key would have brought the middle of the right-hand incline of the slot into engagement with the pin which would, therefore, still be in the disconnect position.

In case the floating lever 112 occupied its normal adding position, as shown in Fig. 7, a depression of the correction key would cause said pin to engage the high middle part of the slot and thus to set master wheel 87 for subtraction. If, however, the follower 113 had been in its depressed position and the pin 103, therefore, in its adding position in the high middle part of the slot 104, then a depression of the correction key would have brought the low right-hand part of the end of the slot, as viewed in Fig. 7, into engagement with the pin, and would have set the master wheel for subtraction.

In order to control the third floating lever 130 from this correction key, the rod 106 is connected by a link 140, Figs. 7 and 25, with a lever 141 which is connected with the rod 131 and shifts this rod but in the opposite direction and with the same effect on the master wheel 88.

In case one of the cross totalizers 72 or 73 shows a negative total, it is necessary in order to clear this totalizer to reverse its master wheel. As this amount will then be written as a negative amount instead of as ordinarily a positive amount, it is necessary in order to have the work correct to reverse the other two master wheels at the same time. This could be done by the correction key 135, but the machine is equipped with a special "credit balance" key 142 for this purpose, said credit balance key not only reversing the master wheels, but performing some other functions as will be explained. This key 142 (Fig. 27) is mounted on a three-armed lever, one arm 143 of which acts as a latch lever, and on the third arm is mounted a release key 144. This three-armed lever is pivoted at 145 to an arm 146 mounted on a rock shaft 147, which in the Remington typewriter controls the ribbon shifting mechanism in such wise that when the credit balance key is depressed it causes the printing to be in red instead of in black. This shaft is journaled near its forward end in a frame plate 149. The arm 146 is prolonged beyond the shaft 147 and is connected by a link 148 with the correction key lever 135 so that a depression of the credit balance key reverses the master wheel. This key, when depressed, is latched down and remains down until released by striking the key 144.

The power mechanism for operating the computing mechanism and the numeral type bars is well known in the art and its essential elements are shown in Fig. 1. The continuously rotating power shaft 26 carries a series of cams 150, one for each numeral key, which cams normally stand in the position shown in Fig. 1, being so held by individual clutches, one member 151 of which is normally arrested by a stop lever 152 pivotally mounted in an auxiliary frame 153. The stop lever 152 is adapted to be tripped to release the clutch for a single rotation of the cam disk 150 by means of a push bar 154 pivoted to the numeral key lever at 155, and controlled by a spring 156. In Fig. 1 the first key 18 shown is one of the clearance-proof keys which does not carry one of these bars 154. This clearance-proof lever is shown broken away in order to show the numeral key lever behind it.

Each cam disk 150 controls a follower roller 157, journaled on an operating arm 158, pivoted on a cross shaft 160, and urged downward by a strong spring 161. Near its rear end the lever 158 is connected by a link 162 with a spacing lever 163 pivoted on a cross shaft 164 in the typewriter frame, to which lever is pivoted the lower end of the pull link 50 which operates the computing mechanism.

When a numeral key is depressed the first result is to add the corresponding number by the mechanism just described. The corresponding type bar is operated by the up-stroke of the lever 158. Pivoted to the end of said lever at 165 is a dog 166, controlled by a spring 167 so as to press its upper end rearward into engagement with the forward arm of a lever 168, pivoted on a cross shaft 170. The rear arm of this lever carries a stud 171 engaging in a slot in the forward end of an operating lever 172 which is pivoted like the other levers of this general character on the cross bar 21 at the rear of the machine. This lever 172 operates the appropriate type bar through the usual bell crank 23 in the same manner as the operating levers 22 of the printing type bars. On the down stroke of lever 158, the dog 166 snaps under the end of the lever 168, which it operates on the up-stroke of lever 158.

*Clearance-proof mechanism*

In each of the cross-totalizers 72 and 73, a comb 175 (Figs. 10 and 24) is pivoted in the side plates and its tines rest against the peripheries of the dial pinions 176 each of which has one shortened tooth 177 so located as to register with the comb when the dial indicates zero. The construction is such that when all of the dials register zero, the comb 175 can swing slightly toward the front, but as soon as any one or more of the dials is turned to indicate some other number, the full-length teeth will force the comb rearward. The comb 175 has an arm 178 articulated with a bell crank whose vertical arm 180 projects through a slot in the top of the casing, and which has a spring 181 pressing the comb 175 against the pinions. When the totalizer is clear, the arm 180 occupies its rear position shown in full lines in Fig. 10, and when it is not clear this arm occupies its forward position shown in dotted lines.

The mechanism just described constitutes clearance testing or indicating mechanism, the state of the totalizer being shown by the position of the arm 180.

All of the mechanism thus far described is or may be of the usual Remington construction, and, as far as the present invention is concerned it may be of any suitable construction.

According to one form of the present invention, the upper end of the arm 180 is notched, having two fingers 182 and 183, and between them a bail bar 184 normally rests on the bottom of the notch as shown in Fig. 9, this bar being longer than the extent of travel of the cross-truck, so that the bar always rests on the arm. The bar 184 is carried on two arms 185 secured to a floating rock shaft 186, the whole constituting a bail having a pivotal motion about the shaft 186. The latter is pivoted in two upright arms 187 secured to a rock shaft 188 pivoted in two of the frame plates 37. The rocking frame 187, 188, is drawn rearwardly by a spring 190 (Fig. 2) against a stop pin 191, but it can swing a short distance forward (Fig. 10), thus giving a bodily forward motion to the bail 184, 185.

The parts are shown in Fig. 9 in the position they occupy after a total has been written, and the totalizer is, therefore, clear and ready to begin a new computation. When a number is written and entered in this totalizer the long teeth of the pinions 176 will force the comb 175 rearward, and the arm 180 forward, thus pulling the shaft 186 slightly further toward the front of the machine than is indicated in Fig. 10. When this occurs an upper prolongation of one of the arms 187 will snap into engagement with a spring-controlled latch 192, pivoted on a shaft 193, which shaft is slidably mounted in brackets 194, secured to the frame casting 36, Fig. 8. The parts will remain in this position throughout the computation, and until the totalizer is clear, the arm 180 sliding back and forth under the bar 184 as the cross-truck travels leftward and jumps back.

When the total is written and the totalizer is cleared the arm 180 will move rearward to the position shown in Fig. 10, but the bar 184 will not move rearward being held by the latch 192.

A cam plate 195, having an inclined edge, as shown in Fig. 8, is mounted on the front face of the bar 184 by two screws entering holes 196 in the bar. There is a series of these holes so that the cam plate 195 can be adjusted to different positions depending on the width of the totalizer. When the arm 180 moves to its rear position the forward finger 183 of said arm comes into line with this cam plate, and when the totalizer jumps back to its right-hand position the top of this finger engaging the incline of the cam momentarily raises the bail bar 184 to its upper position, shown in Fig. 10, and it is this upward pivotal motion of the bail which initiates the printing of the clear sign.

The bar must not remain in its forward position as otherwise a clear signal would be printed at every reciprocation of the cross-truck, as long as it remained clear. Means are, therefore, provided to restore the bail 184, 185 immediately to its Fig. 9 bodily position. To this end the latch 192 is pivoted between two collars on the shaft 193 which is free to slide a short distance endwise, and is held in its normal position by a compression spring 197. The shaft has an arm 198, adjustably mounted thereon and standing in the path of an arm or bracket 200, Figs. 8 and 11, secured to the cross truck 74. The construction is such that when this truck jumps back to its right-hand position it slides the shaft 193 lengthwise so as to move the latch 192 away from the arm 187 and permits said arm and the parts connected with it to be pulled by the spring 190 back to the Fig. 9 position. As soon as the cross-truck is drawn away from its normal position by a vertical totalizer the spring 197 restores the shaft 193 to its normal position. This shaft slides back and forth at every reciprocation of the cross-truck, and for that reason the parts are so proportioned that when the arm 180 moves forward from its Fig. 9 position the upper end of the arm 187 is moved a little further forward than shown in Fig. 10 so that the latch 192 can make this right and left reciprocation without interference from the arm.

The mechanism above described is duplicated, there being one entire set of it for each of the two cross totalizers, as clearly indicated in Figs. 6, 8, and 11. Both of the two latches 192 are mounted on the same sliding shaft 193, which shaft has one flat end, as shown in Fig. 8, to prevent its rotation.

In order for the upward pivotal motion of the bar 184 to initiate the printing of a clear sign, one of the arms 185 is prolonged toward the rear. In the case of the right-hand (left-hand in Fig. 8) mechanism this arm is provided with a pin which enters a slot in the forward end of an arm 201, mounted on a rock shaft 202, which rock shaft is journaled in a bracket 203, secured to the top plate 3 of the typewriter. At its inner end or right-hand end, as shown in Fig. 8 this shaft has an arm 204 connected by a link 205 with an arm 206 mounted on the end of a rock shaft 207, which is journaled in a quill 208 (Fig. 8) passing through the corner post 2 of the typewriter. At its inner end or right-hand ends, as shown in Fig. 8 this rock shaft has an arm 210 to which is pivoted the upper end of a push bar 211, which near its lower end is guided in a slot in a sheet metal bracket 212, and whose lower end stands over one of the character key levers of the machine. The construction is such that when the bail bar 184 moves upward this push bar 211 is thrust downward, and depresses the key lever.

The left-hand bail 184, 185 is similarly connected through an arm on a rock shaft 219, a link 213 and rock shaft 214, to a second push bar 215 standing beside the bar 211 and similarly guided, its lower end standing over the second key lever to the right of the one covered by the push bar 211. The construction is such that if one of the cross totalizers is cleared, the appropriate printing key lever will be depressed to print a clear sign, and if both totalizers are cleared at the same operation two printing key levers will be depressed to print two clear signs simultaneously.

In case the total to be printed is negative (a so-called credit balance) it is desirable that a distinctive sign be printed to indicate that fact. When a credit balance occurs the operator depresses the credit balance key 142 in order to print the total in red, and to reverse the master wheels. The shaft 147, which is rocked by this key, has two depending arms 216 connected by light wires 217, to the two push bars 211 and 215, with the result that when the credit balance key is depressed these push bars are pushed slightly to the right, the guide slots in the plate 212 being elongated to permit of this motion. This moves these two bars from over the key levers originally covered by them to two other key levers respectively, as will be clearly understood from Fig. 8.

As shown in the present instance clearance of the right-hand cross totalizer 73 from a positive total is indicated by printing a star, and printing of a similar total from the left-hand totalizer 72 is indicated by printing a triangle. Clearance of the totalizer 73 from a negative total is indicated by printing the letters CR, and clearance of the totalizer 72 from a negative total is indicated by printing the same letters, but in a peculiar style, shown in the drawings. In various places in the drawings the parts have been indicated by the star and the triangle for convenience of designation. The four key levers 20, which are used for printing these signs, are designated by their respective signs in Fig. 8, and the signs are shown on the key caps in Fig. 6. These four key levers have, or are connected with the same projections 35, trip levers 32, hooks 27 and operating levers 22, and bell cranks 23 as the other character key levers, and they print their respective characters much the same as any other key lever. In the drawings they are shown extended into the keyboard and provided with key caps for manual operation, but usually they would be cut off just in front of the front guide comb 218, Fig. 1. As it is desirable that these four key levers be consecutive the star key has been extended into the front row of keys where in Fig. 1 it is shown with a part broken out so as to expose the numeral key lever behind it.

As it is sometimes desirable to print two clear signs at once, the two type bars 6 which print the positive and negative clear signs for the right-hand or star totalizer, pass through the regular center guide 220 of the typewriter and print in the usual way, but the other two type bars which print the clear signs for the left-hand or triangle totalizer are set at a different angle and so disposed that they print just to the right of the regular printing point, as shown in Figs. 16 and 19. To permit of this the right-hand part of the center guide is cut away, as shown in Fig. 19.

It is believed that the mode of operation of the mechanism will be understood from what has been said above. At the beginning of a problem the parts stand in the position shown in Fig. 9. As soon as a number is added in one of the totalizers its arm 180 moves toward the front of the machine, its finger 182 drawing with it the bail 184, 185, 186, and the arm 187 moves into position to be latched by 192. As number after number is added or substracted the parts continue in this position, the arm 180 sliding along the bar 184 as the cross truck moves back and forth. On the last key stroke which clears the totalizer the arm 180 moves to its rear position shown in Fig. 10, and on the jump-back of the cross truck its finger 183 raises the cam 195 and depresses one of the key levers 20, as shown in Fig. 10. This depression is only momentary because the bracket 200 slides the shaft 193 lengthwise and releases the arm 187, which immediately moves back to the position shown in Fig. 9, drawing the cam plate 195 from over the finger 183 and allowing the parts to return to the position shown in Fig. 9. Meanwhile, however, the hook 27, Fig. 1, has been moved into engagement with the snatch roll 25, and the clear sign is printed. This may happen as to either of the cross totalizers singly, or it may happen as to both of them at the same operation. In case of a negative total the credit balance key 142 would have been depressed shifting the push bars 211 and 215 toward the right so as to print the appropriate sign or signs to indicate a negative total.

A practical instance of one way of using the present invention, is illustrated in Fig. 29, which shows fragments of an audit sheet 221 and a ledger sheet 222 used in the bookkeeping in a savings bank. The audit sheet, greatly shortened up and down, and the depositor's ledger sheet, are shown in the relative positions they occupy on the platen 5 of the typewriter. The ledger sheet contains at the top the name of the depositor and his account number, and on the body of it columns for date, withdrawals, deposits and the resulting balances. Amounts written on this sheet are duplicated by carbon paper on the audit sheet. The latter is wider than the ledger, and contains in addition to the ledger columns other columns for account number, ledger pick up, and pass book balance. At each transaction the depositor hands to the teller a deposit ticket or a withdrawal ticket as the case may be, together with his pass book. The teller enters in the pass book the amount deposited or withdrawn, together with the depositor's new balance, which he computes mentally; and he also writes the amount of the new balance on the ticket, which finally finds its way to the operator of the present machine. She has an audit sheet in her machine, on which she enters the transactions for the day. When she comes to the ticket under consideration, she inserts into the machine the ledger sheet having the same account number and writes on the audit sheet and ledger sheet the items shown in Fig. 29. The "ledger pick up" is the last preceding balance, which she copies from the ledger sheet. The "pass book balance" is copied from the ticket where the teller had written it; also the withdrawal or deposit is copied from the ticket.

Each of the five columns for amounts of money is represented on the truck 36 by a vertical totalizer 41, which, as an entry is being made in that column, picks up the cross truck 74. The control cams 114 for the left-hand or triangle cross totalizer 72, and 126 for the right-hand or star totalizer 73, are set on these five vertical totalizers so as to cause the machine to operate as follows: the ledger pick up is added in 72 and not added in 73; the pass book balance is added in 73 and not added in 72; withdrawals are subtracted in 72 and not entered in 73; deposits are added in 72 and not entered in 73; and, finally, the balance is subtracted in both 72 and 73. In short, the totalizer 73 is set for addition in the pass book balance column, for subtraction in the balance column, and at "disconnect" in all other columns; while totalizer 72 is set at add in the ledger pick up and deposits columns, at subtract in the withdrawal and balance columns, and at "disconnect" in the pass book balance column.

It will be perceived that if the work is all correctly done, when the carriage reaches the balance column both totalizers will show the same balance, both will be cleared when that balance is correctly copied from, say, totalizers 72, and both clear-signs will be printed as shown in Fig. 29. Any one of the following errors will prevent the two clear-signs from being printed simultaneously—(1) If the teller enters the new balance incorrectly on the ticket. (2) If the operator inserts the wrong ledger sheet in the machine. (3) If the operator copies or "picks up" the ledger balance incorrectly. (4) If the operator picks up the pass book balance incorrectly from the ticket. (5) If the operator posts the deposit or withdrawal incorrectly, either by copying the amount incorrectly or by posting it in the wrong column. If the machine automatically prints both clear signs, it is proof that all of the above operations were performed correctly. It will be noted that this far reaching proof of correct work requires of the operator no additional labor except that required to copy the pass book balance from the ticket. Even this should be done anyway, as a record of the entry made by the teller in the depositor's pass book.

This mechanism affords a further proof as follows: The five vertical totalizers 41 preserve totals of the amounts entered in their respective columns on the audit sheet during the entire day's work. At the end of the day, after the last entry, the operator writes the line marked "control", first reversing the vertical master wheel by setting the lever 107 at subtract. This does not reverse the cross master wheels. The amounts in the "control" line, including the last or "balance", are all copied from the several vertical totalizers, and each is the total of its respective column for the day. These several totals are entered in the cross totalizers in exactly the same way as a line of items, and if the entire day's work has been correctly done, the copying of the balance will clear both cross totalizers, as indicated by the printing of both clear signs.

As the vertical master wheel was set at subtract in the operation, all of the vertical totalizers will be cleared. In short, all totalizers will then be clear, ready for the next day's work.

In practice, the audit sheet may have at the right of the balance column another column headed "Difference", which may be used as follows: On the main truck 42, this column would be represented by a totalizer whose cams 114 and 126 would set cross totalizers 72 for disconnect and cross totalizer 73 for, say, subtract.

In case of a failure of both clear signs printing, the operator knows that a mistake has been made. If on inspection she finds that the error is her own, she corrects it in the manner regularly practiced with these machines, whereupon the two signs will be automatically printed. But she may find that the error occurred before the work reached her; that is to say, in the particular instance described, it may be that the teller has entered the wrong balance in the pass book and on the ticket. This she cannot correct. If, as above supposed, she copies the balance from totalizer 72, this will have been cleared and the amount of the teller's error will appear on totalizer 73, as a positive amount if the teller entered too large a balance, or negatively as a complement if he entered too small a balance. In the former case, the operator steps the carriage into the difference column and writes there the amount of the over-credit as it appears on totalizer 73, which clears that totalizer. In case of a negative error, the operator depresses the credit balance key and writes the amount of the under-credit. This reverses the master wheel, adds the amount necessary to clear totalizer 73, and causes it to be printed in red. At the end of the day, the difference column contains a list of any erroneous entries made by the teller in pass-hooks, over-credits being written in black and under-credits in red. This list may be used in any suitable way to bring about the necessary corrections.

In case the teller has made errors the writing of the balance in the control line will not clear totalizer 73. Any such errors will, however, have been entered in the difference vertical totalizer positively or negatively according as they were over- or under-credit, and their balance will appear in that totalizer. When this balance is copied in the control column it will clear both the vertical totalizer and also the cross totalizer 73 if the work has been correctly done.

It will be seen that it is desirable that the operator always copy the balance from the same one of the two cross totalizers. In order to insure that she does that, some users set up the machine, that is to say, the cams 114 and 126, so that amounts are entered in cross totalizer 73 the reverse of that described above. In this way the amount of the balance will appear on that totalizer by its complement which is not so easily read as the true amount as it appears on totalizer 72.

It will be obvious that if desired the machine can be used as an "algebraic" machine, by arranging the cams 114 and 126 in each instance the reverse of each other, that is to say, on each vertical totalizer where one cam is set for add the other is set for subtract. In that case both totalizers will always show the same balance, in its true amount on one totalizer and by its complement on the other, all positive balances appearing in true figures on one of the totalizers and all negative balances in true figures on the other totalizer. Clearing one totalizer would also clear the other.

As thus far described, it has been left to the operator, or to the auditor on examination of the audit sheet, to observe that both clear signs were printed, but the invention also includes means for calling the operator's attention at once at any failure of the printing of both signs. This means may be of various kinds, such as an audible or other noticeable signal. In the form shown in the present instance, advantage is taken for this purpose of the automatic carriage return mechanism ordinarily employed in the Remington accounting machine. This mechanism is so arranged that when the typewriter carriage reaches a certain step in its leftward travel, the motor of the machine is automatically coupled to the carriage and returns it to its right-hand position and line-spaces the paper. According to one form of the present invention this will not occur unless both clear signs are printed simultaneously. If the carriage does not return the operator will find the accustomed routine of her work interrupted and the machine brought to a stand-still. This she cannot help observing.

Automatic carriage return mechanisms, including that in use in the Remington accounting machine, are well known in the art, and any suitable carriage return mechanism may be used for the present purpose. That used in the Remington accounting machine can be sufficiently well understood for the present purpose from Figs. 12, 13, 14, and 15 of the drawings. As shown in Fig. 2, a rack 223 is mounted on the rear rail of the carriage 4, and it meshes with a pinion 224 fast on the upper end of a shaft 225, journaled in the top plate 3 and in certain frame brackets. Loose on this shaft is a worm wheel 226 meshing with a worm 227 fast on a transverse shaft 228. This shaft is coaxial with a shaft 230 which carries a pulley 231 driven by a belt from the motor of the machine. The shaft 230 can be coupled with the shaft 228 by means of a sliding clutch member 232, having a peripheral groove into which a stud projects from a bell crank 233 by rocking which the clutch can be opened and closed. The worm wheel 226 can be clutched to the shaft 225 by a clutch member 234 splined to the shaft and slid lengthwise of it by an arm 235 fast on a rock shaft 236. This rock shaft also carries an arm 237 which engages in a slot in the horizontal arm of the bell crank 233. The construction is such that if the shaft 236 be rocked clockwise in Figs. 12 and 13 it will move both clutches into engagement, thus connecting the carriage to be restored to its right-hand position by the motor.

The shaft 236 is urged clockwise by a spring 238, Fig. 12, and it is normally held in unclutched position by a latch 240 engaging over the end of an arm 241 fast on the left-hand end of the shaft. A carriage return operation is initiated by tripping this latch. To that end a hook 242 normally engages a stud projecting from the latch 240, said link being operated by a lever 243, pivoted on the end of a transverse rock shaft 244 having a carriage return key or lever 245 mounted on its right-hand end. Near its left-hand end this shaft has fast thereto an arm 246 which carries a stud adapted to rock the lever 243 when the key 245 is depressed, but leaving said lever free to be operated by means other than the key. This lever is connected by an upright link 247 with one arm of a bell crank 248, the two arms of which are mounted on the two ends of a short shaft, pivoted in a bracket 250 on the top plate of the typewriter. To the upright arm of bell crank 248 is pivoted one end of a sliding rod 251 which near the middle of the machine carries a finger 252 adapted to be engaged at the end of the leftward travel of the carriage by the usual adjustable margin stop 253. This stop can be set to any desired letter space position so that on any desired step of the carriage the rod 251 will be shifted leftward (toward the right in Fig. 12), and through bell crank 248, link 247, and lever 243, the hook, or link 242 will be operated to trip the latch 240 and initiate a carriage returning operation.

The carriage is equipped with another adjustable margin stop 254 which, at the end of the return motion of the carriage, strikes a lug 255 on a rod 256 and slides said rod toward the right. Said rod is pivoted to a bell crank 257, to the horizontal arm of which is pivoted a link 258, which operates a spring restored bell crank 260 to which is pivoted a bar 261. This bar, at its rear end, is guided by a fixed pin 262 passing through a slot in the bar. On its under side this bar has a cam hump 263 which when the bar is pulled forward rides on and depresses a roller 264 on the arm 241, thus restoring said arm to its normal position and disconnecting the clutches.

When doing billing work it is customary to set the margin stop 253 so that it will trip the carriage return mechanism at the last step of the carriage which would ordinarily occur at the end of the writing of a line. If, for example, no question of clear signals entered into the problem, this stop would be set so as to return the carriage by reason of the step thereof from units to sub-units position in the last column on the paper. Where a clear sign is printed after the last column, then the stop is so set as to initiate the return of the carriage on that stop following the writing of the clear sign.

In the present instance it is desired to cause the carriage to be returned by the simultaneous writing of the two clear signs and not to be returned if only one of the signs is printed. One form of mechanism for this purpose is shown in Figs. 2, 3, 4, and 5 of the drawings. The ordinary type bars like that shown at the bottom of the segment in Fig. 2 have a heel 265 which operates the universal bar 8 to cause the stepping of the carriage. In the case of the four type bars used for printing clear signs, two of which are shown in Fig. 2, this heel is cut away so that these four type bars do not operate the universal bar to cause a stepping of the carriage, and special means are provided to cause the stepping of the carriage to take place only on the printing of both clear signs.

Each of the four bell cranks 23 which print the clear signs, has pivoted thereto a link 266 extending toward the rear of the machine. The links for the star and triangle signs are connected to the two ends of an evener bar 267, which, at its middle point, is pivoted to a plunger or rod 268 passing through a hole in an ear bent off from a lever 270. Behind said ear the plunger 268 is surrounded by a light spring 271 compressed between said ear and a nut 272 screwed on to the plunger. The construction is such that if either one of the two bell cranks for the star and the triangle is operated alone the plunger 268 will be moved forward only half way, which will be insufficient to rock the lever 270, but if both bell cranks are operated simultaneously the plunger will be moved its entire distance, sufficient to rock said lever.

The two bell cranks 23 for the credit clear signs of the two cross totalizers, are similarly connected to a second plunger with a like result. In the particular set-up under consideration the balance will be either positive or negative, and in case of a correct operation either the two bell cranks will be operated for printing positive clear signs, or else the two will be operated for printing negative clear signs. In either event the lever 270 will be operated, but in no other event. In some other set-up for another problem the eveners 267 might be hooked up in other ways.

The lever arm 270 is fast on a rock shaft 274, suitably pivoted in the frame work of the machine, and provided with an upright arm 275 which is forked at its upper end so as to have its motion in one direction arrested by a certain transverse shaft 276. The forward tine of the fork engages a pin 277 projecting from the link 11, which operates the carriage escapement.

For this particular problem the margin stop 253 is so set that it initiates the return of the carriage on that step of the carriage caused by the mechanism just described; that is to say, by the simultaneous printing of the two clear signs. Failing such simultaneous printing the carriage will not return and the operator will thereby be notified that a mistake has been made. It will be apparent that, in the present instance, the above described construction and/or the carriage return mechanism constitutes carriage controlling or feeding means dependent for their operation on the resultant state or the simultaneous clearance of both totalizers.

Where the difference column is used, as hereinbefore described, the carriage, in case no mistake has been made, will automatically return to its starting position without moving into the difference column; and in case a mistake has been made it will stop in the sub-units position of the balance column. The machine may be equipped with a margin release device to permit the operator to step the carriage into the difference column, or she may temporarily slide the margin stop 253 to the right far enough to allow the necessary motion to the carriage. After the difference has been written, she may re-adjust the margin stop. This is permissible as these teller's errors should be of relatively infrequent occurrence.

A simpler form of the invention, applicable to key operated as distinguished from power operated machines, is shown in Figs. 20, 21, 25, and 27. In this form of the invention there is utilized a modification of the star-proof of clearance mechanism heretofore employed in the Remington accounting machine. In Fig. 25, 1800 represents the upper end of the clearance indicating finger, like the finger 180, except that it is of the usual form instead of being forked as shown in the first form of the invention. There are two of these fingers, one for each cross totalizer and each of them cooperates with a cam 280 mounted on an arm 281, which at 282 is pivoted to the frame of the machine. The arm 281 has a row of screw holes so that the cam can be secured to it by screws 283 in different positions depending on the width of the totalizer. Each arm 281 is in the nature of a bell crank to whose upstanding arm is pivoted a sliding bar 284. The ends 285 of these two bars project through slots in one of the frame plates 37, which plate is not shown in Fig. 25 to avoid obscuring the other mechanism. To this plate on a screw 286 are pivoted two levers 287 which are connected by links 288 with a nested pair of rocking frames or levers 290, pivoted on a frame rod 291. These levers are connected by links 292, Figs. 25, 20, and 21 with the key levers 293, one of which carries the triangle key 294 and the other the star key 295. The arms 281 normally occupy their lower positions shown in Fig. 25, in which positions the locking ends 285 stand in the paths respectively of the upstanding arms of the levers 287 and prevent operation of said levers and therefore lock against operation the two keys 294 and 295. The fingers 1800 travel back and forth with the cross totalizers and in their right-hand position (left-hand position in Fig. 25 which is a rear view) each of them stands under its cam 280 if the totalizer is clear, and just in front of said cam if the totalizer is not clear. The cross truck jumps back to its right-hand position after the writing of each number, so that each of these arms 281 when the cross truck is in its right-hand position will stand in its lower locking position, if the corresponding totalizer is not clear, but will have been cammed up to its unlocking position if the totalizer is clear. After the writing of the last digit of the number, therefore, the key 295 will be unlocked so that the operator may print the star provided the right-hand totalizer 73 is clear and the key 294 will be free to be operated, provided the cross totalizer 72 is clear.

In such a piece of work as that indicated above where, if the work has been correctly done, both cross totalizers should be clear, then the two keys 295 and 294 may be struck successively to print first the star and then the triangle. In this form of the invention all of the type bars enter the center guide and print at the same point.

In case the machine is equipped as it now usually is with an automatic carriage return mechanism, the margin stop 253, Fig. 12, would be set so as to trip the carriage return mechanism in the second step of the carriage following the writing of the last digit of the balance.

In order to make the same distinction as in the first form of the invention between positive and negative balances, the key levers 293 are connected with the type bars by the means shown in Fig. 27. In this figure 2300 represents four of the bell cranks 23 for printing the four clearance signs. The two key levers 293 are connected to these bell cranks, not directly as in the ordinary key operated typewriter, but indirectly to two links 296, each secured to one of the key levers 293 by two rivets 297, which, however, are not drawn up tight against the key levers so that the links 296 may have a slight rocking movement right and left at their upper ends. Each of these links passes up between the horizontal arms of two of the bell cranks 2300, and is formed with a pair of ears 298 bent respectively toward the right and toward the left, and of such dimensions that one of them overlies one of the bell cranks. In Fig. 27 the ears 298 overlie the first and third bell cranks respectively, counting from the right in that figure, so that if one of these keys is depressed it will print the star, and if the other is depressed it will print the triangle. If both links be swung to the left as viewed in Fig. 27, the ears 298 will pass from over those two bell cranks and will engage the two bell cranks to the left of the links so that if in that position the keys 295 and 294 are depressed they will print respectively the letters CR in one instance in plain letters, and in the other according to the peculiar design shown, for example, in Fig. 3.

In order to shift these two links, as above described, the shaft 147 of the credit balance key is provided with two depending arms 2160 which are connected with the upper ends of these links by two wires 2170, the arrangement and mode of operation being similar to that described in the first form of the invention. It will be perceived that in this form of the invention, as in the other, whether or not a clear sign will be printed will depend upon the clearance or non-clearance of the totalizer; and if a clear sign is printed, whether it be a positive or negative clear sign will depend upon the position of the credit balance key. The above described mechanism is similar in some respects to that disclosed in the patent to Walsoe No. 1,738,977.

Various changes may be made in the details of construction and certain features thereof may be employed without others without departing from the invention as it is defined in the accompanying claims.

Having thus described my invention, what I claim as new and desire to secure by Letters Patent is:

1. In a computing and printing machine having a totalizer mounted on a to-and-fro traveling carriage, the combination of a clearance testing device in said totalizer and having clear and not-clear positions, a non-traveling cam device moved by said testing device from clear to not-clear position, a latch for holding said cam device in not-clear position, and means whereby said latch is released at the proper time by said traveling carriage.

2. In a computing machine having a carriage and two totalizers, clearance proof mechanism one for each totalizer, carriage escapement mechanism, and means for operating said carriage escapement mechanism including a member movable by either of said clearance proof mechanisms singly from one idle position to another idle position and movable by simultaneous operation of said clearance proof mechanisms to an effective position.

3. The combination of totalizers, separate clearance testing devices, one for each totalizer, a respective clear-sign type bar for each totalizer, actuating means for the clear-sign type bars, a paper carriage, separate controlling means controlled by respective ones of said testing devices for causing operation of respective clear-sign type-bars by said actuating means, means for moving said carriage, and means operable by simultaneous operation of said type bars for controlling said carriage moving means.

4. In a machine of the class described, the combination with two totalizers and means for entering items additively or subtractively in said totalizers, of individual clearance-testing devices for said totalizers, individual clear-sign printing devices under control of said clearance-testing devices, a carriage escapement mechanism, and means responsive to the simultaneous operation of said clear-sign printing devices for operating said escapement.

5. In a machine of the class described, the combination with two totalizers and means for entering items additively or subtractively in said totalizers, of individual clearance-testing devices for said totalizers, individual clear-sign printing devices under control of said clearance-testing devices, a carriage escapement mechanism, means responsive to the simultaneous operation of said clear-sign printing devices for operating said escapement, and a carriage return device responsive to such operation of said escapement mechanism.

6. The combination of an accumulator, a clear-sign printing device, a clearance testing device for said accumulator and movable from clear to non-clear positions and vice versa, a frame movable by said clearance testing device from one position to a second position upon movement of said device from clear to non-clear positions, means for holding said frame in said second position, and a cam on said frame and cooperating with said testing device upon return of the latter to clear position for moving said frame to a third position for effecting actuation of said clear sign printing device.

FREDERICK A. HART.

CERTIFICATE OF CORRECTION.

Patent No. 2,083,994. June 15, 1937.

FREDERICK A. HART.

It is hereby certified that error appears in the printed specification of the above numbered patent requiring correction as follows: Page 1, first column, after line 42, insert the following paragraph:

Throughout the following description, when I refer to parts as being of "usual construction" it is to be understood that such parts have been used for example in Remington machines for many years and may be found in the machine now known as the No. 85 Remington electrified bookkeeping machine.

and that the said Letters Patent should be read with this correction therein that the same may conform to the record of the case in the Patent Office.

Signed and sealed this 21st day of September, A. D. 1937.

Henry Van Arsdale (Seal) Acting Commissioner of Patents.